(12) United States Patent
Akazaki et al.

(10) Patent No.: US 10,416,041 B2
(45) Date of Patent: Sep. 17, 2019

(54) COMBUSTION STATE PARAMETER CALCULATION METHOD FOR INTERNAL COMBUSTION ENGINE

(71) Applicants: HONDA MOTOR CO., LTD., Tokyo (JP); KEIHIN CORPORATION, Tokyo (JP)

(72) Inventors: Shusuke Akazaki, Wako (JP); Taisuke Inoue, Wako (JP); Shunichi Saito, Tochigi-ken (JP)

(73) Assignees: HONDA MOTOR CO., LTD., Tokyo (JP); KEIHIN CORPORATION, Tokyo (JP)

( * ) Notice: Subject to any disclaimer, the term of this patent is extended or adjusted under 35 U.S.C. 154(b) by 551 days.

(21) Appl. No.: 14/950,183

(22) Filed: Nov. 24, 2015

(65) Prior Publication Data

US 2016/0146703 A1 May 26, 2016

(30) Foreign Application Priority Data

Nov. 25, 2014 (JP) ................................. 2014-237646

(51) Int. Cl.
*G01M 15/08* (2006.01)
*G01M 15/11* (2006.01)

(52) U.S. Cl.
CPC .................................. *G01M 15/08* (2013.01)

(58) Field of Classification Search
CPC .. F02D 35/023; F02D 35/027; F02D 19/0623; F02D 19/0689; F02D 41/2474;
(Continued)

(56) References Cited

U.S. PATENT DOCUMENTS

2003/0110845 A1* 6/2003 Kumagai ................ F02D 13/06
73/114.05
2008/0059044 A1* 3/2008 Mizuno .................. G01L 23/221
701/102
(Continued)

FOREIGN PATENT DOCUMENTS

CN 1954142 A1 4/2007
CN 101105154 A1 1/2008
(Continued)

OTHER PUBLICATIONS

Oct. 31, 2017 Office Action issued in Chinese Patent Application No. 201510811681.4.
(Continued)

*Primary Examiner* — Duy T Nguyen
(74) *Attorney, Agent, or Firm* — Squire Patton Boggs (US) LLP

(57) ABSTRACT

A combustion state parameter calculation method for an internal combustion engine, which is capable of continuously calculating a combustion state parameter while properly maintaining the accuracy of the calculated parameter even when part of in-cylinder pressure sensors is in failure. In the combustion state parameter calculation method, as a combustion state parameter, a first combustion state parameter dependent on the magnitude of in-cylinder pressure is calculated based on a detection value from an in-cylinder pressure sensor, on a cylinder-by-cylinder basis. When it is determined that a characteristic abnormality failure in which the magnitude of the detection value deviates from the actual in-cylinder pressure has occurred in part of the in-cylinder pressure sensors and has not occurred in the other in-cylinder pressure sensors, the first combustion state parameter of a failure-determined cylinder is calculated based on
(Continued)

the detection value from the other in-cylinder pressure sensors.

4 Claims, 11 Drawing Sheets

(58) Field of Classification Search
CPC ..... F02D 41/222; G01M 15/08; G01M 15/11; G01L 27/007; G01L 27/005
USPC .......................................................... 702/127
See application file for complete search history.

(56) References Cited

U.S. PATENT DOCUMENTS

| | | | | |
|---|---|---|---|---|
| 2008/0236264 | A1* | 10/2008 | Sato | F02D 35/023 73/114.18 |
| 2009/0241883 | A1* | 10/2009 | Nagoshi | F02N 11/0825 123/179.4 |
| 2014/0260574 | A1* | 9/2014 | Sasaki | F02D 41/009 73/114.16 |
| 2015/0322877 | A1* | 11/2015 | Eser | F02D 41/0085 73/114.16 |

FOREIGN PATENT DOCUMENTS

| | | |
|---|---|---|
| CN | 103670749 A1 | 3/2014 |
| DE | 4127950 A1 | 3/1992 |
| DE | 19521738 A1 | 12/1995 |
| DE | 69416795 T2 | 7/1999 |
| DE | 10233583 A1 | 2/2004 |
| DE | 102004048330 A1 | 4/2006 |
| DE | 102007000294 A1 | 12/2007 |
| DE | 102011086063 A1 | 5/2013 |
| DE | 102012210301 B3 | 9/2013 |
| DE | 102015205917 A1 | 10/2015 |
| EP | 2778379 A1 | 9/2014 |
| JP | S62-162751 A1 | 7/1987 |
| JP | 261290 A | 3/1990 |
| JP | 2612090 B2 | 5/1997 |
| JP | 2001-140664 A | 5/2001 |
| JP | 2007-247604 A | 9/2007 |
| JP | 2012-255401 A | 12/2012 |
| WO | WO2013189839 | * 12/2013 |

OTHER PUBLICATIONS

Japanese Office Action application No. 2014-237646 dated Jun. 14, 2016.
German Search Report for DE Application No. 10 2015 223 202.6, dated Feb. 24, 2016.
German OA, Application No. 10 2015 223 202.6, dated Feb. 25, 2016.

* cited by examiner

COMBUSTION STATE PARAMETER CALCULATION METHOD FOR INTERNAL COMBUSTION ENGINE

BACKGROUND OF THE INVENTION

Field of the Invention

The present invention relates to a combustion state parameter calculation method for an internal combustion engine, which calculates a combustion state parameter indicative of a combustion state in a cylinder based on a value detected by an in-cylinder pressure sensor for detecting pressure in a cylinder of the engine.

Description of the Related Art

As a conventional control system for an internal combustion engine using a result of detection by an in-cylinder pressure sensor, there has been known one disclosed e.g. in Japanese Patent Publication No. 2612090. In this control system, a crank angle at which pressure in a cylinder (in-cylinder pressure) detected by the in-cylinder pressure sensor becomes maximum is calculated as a peak crank angle, and ignition timing is feedback-controlled such that the peak crank angle becomes equal to a predetermined optimum value. More specifically, a feedback correction amount is calculated by multiplying a difference between the optimum value and the peak crank angle by a predetermined gain, and the calculated feedback correction amount is added to a map value of the ignition timing, whereby the ignition timing is calculated.

Further, in this control system, when the calculated feedback correction amount is out of a predetermined range, it is determined that the in-cylinder pressure sensor is in failure, and the output from the engine is suppressed by fixing the ignition timing to the above-mentioned map value for fail-safe purposes.

Various combustion state parameters can be acquired from the result of detection by the in-cylinder pressure sensor, as information indicative of the combustion state, such as pressure generated by combustion in the cylinder and states of generation of heat and energy, and the acquired combustion state parameters are used for the control of the engine and a vehicle equipped with the engine. For example, it is possible to calculate, as a combustion state parameter, a torque generated by combustion in the cylinder on a cylinder-by-cylinder basis, and calculate a total value of the calculated torques as a total torque actually output from the engine, and the calculated total torque of the engine is used for torque control of the engine responsive to a torque request by a driver of the vehicle, transmission control of a transmission device, and so forth.

For this reason, even when the in-cylinder pressure sensor is in failure, it is desirable that calculation of the combustion state parameters is performed as continuously as possible. Otherwise, the above-mentioned control of the engine and the vehicle has to be stopped. However, in the above-mentioned conventional control system, in a case where it is determined that the in-cylinder pressure sensor is in failure, the ignition timing is merely fixed to a predetermined value on the low-output side as a fail-safe operation, and the ignition timing control according to the peak crank angle is stopped.

SUMMARY OF THE INVENTION

It is an object of the present invention to provide a combustion state parameter calculation method for an internal combustion engine, which is, even when part of in-cylinder pressure sensors is in failure, capable of continuously calculating a combustion state parameter in a manner properly maintaining accuracy thereof, based on a value detected by an in-cylinder pressure sensor, which more properly reflects the combustion state of a cylinder provided with the in-cylinder pressure sensor in failure.

To attain the above object, in a first aspect of the present invention, there is provided a combustion state parameter calculation method for an internal combustion engine, which calculates, based on detection values from a plurality of in-cylinder pressure sensors provided in at least two cylinders of the engine, each for detecting in-cylinder pressure which is pressure in a cylinder associated therewith, a combustion state parameter indicative of a combustion state in the cylinder, comprising a first combustion state parameter-calculating step of calculating, as the combustion state parameter, a first combustion state parameter dependent on the magnitude of the in-cylinder pressure, based on the detection value from the in-cylinder pressure sensor, on a cylinder-by-cylinder basis, and a failure determining step of determining whether or not a characteristic abnormality failure in which the magnitude of the detection value from the in-cylinder pressure sensor deviates from an actual in-cylinder pressure has occurred, on an in-cylinder pressure sensor-by-in-cylinder pressure sensor basis, wherein when it is determined that the characteristic abnormality failure has occurred in at least one of the in-cylinder pressure sensors, and has not occurred in at least one of the other of the in-cylinder pressure sensors, the first combustion state parameter-calculating step calculates the first combustion state parameter of a cylinder provided with the at least one of the in-cylinder pressure sensors, based on the detection value from the at least one of the other of the in-cylinder pressure sensors.

With this configuration, based on the detection value from each of the in-cylinder pressure sensors provided in at least two cylinders of the engine, the first combustion state parameter dependent on the magnitude of the in-cylinder pressure is calculated, on a cylinder-by-cylinder basis, as the combustion state parameter indicative of the combustion state in the cylinder. Further, it is determined whether or not a characteristic abnormality failure (failure of deviation of the detection value from the actual in-cylinder pressure) has occurred in any in-cylinder pressure sensor. Then, if it is determined that the characteristic abnormality failure has occurred in at least one of the in-cylinder pressure sensors, and has not occurred in at least one of the other of the in-cylinder pressure sensors, the first combustion state parameter of the cylinder provided with the in-cylinder pressure sensor which is determined to be in failure (hereinafter referred to as the "failure-determined cylinder") is calculated based on the detection value from the other in-cylinder pressure sensor which is determined to be not in failure.

The first combustion state parameter is dependent on the magnitude of the in-cylinder pressure, and corresponds to the maximum value of the in-cylinder pressure, a torque/output generated by combustion or the like. Therefore, in a case where the characteristic abnormality failure occurs in the in-cylinder pressure sensor, causing the detection value from the in-cylinder pressure sensor in failure to deviate from the actual in-cylinder pressure, even when the first combustion state parameter is calculated based on the detection value, the accuracy of the calculated parameter cannot be ensured, and rather, the first combustion state parameter can be obtained with higher accuracy based on the detection value from the other in-cylinder pressure sensor free from the characteristic abnormality failure.

From the above viewpoint, according to the present invention, when it is determined that the characteristic abnormality failure has occurred in part of the in-cylinder pressure sensors, the first combustion state parameter of the failure-determined cylinder is calculated based on the detection value from the other in-cylinder pressure sensor free from the characteristic abnormality failure. This makes it possible to continuously calculate the first combustion state parameter of the failure-determined cylinder while properly maintaining the accuracy of the calculated parameter, and therefore, it is possible to continuously perform control of the engine and the like using the first combustion state parameter with high accuracy.

Preferably, the in-cylinder pressure sensor is provided in each of all cylinders of the engine, and the first combustion state parameter is a torque parameter indicative of a torque which is generated by combustion in the cylinder, and the combustion state parameter calculation method further comprises a total torque parameter-calculating step of calculating a sum of the torque parameters of all of the cylinders as a total torque parameter indicative of a total torque output from the engine.

With this configuration, based on the respective detection values from the in-cylinder pressure sensors provided in all of the cylinders of the engine, a torque parameter indicative of a torque generated by combustion is calculated as the first combustion state parameter, on a cylinder-by-cylinder basis. Further, the sum of the calculated torque parameters of all of the cylinders is calculated as the total torque parameter indicative of the total torque output from the engine.

As described above, when it is determined that the characteristic abnormality failure has occurred in part of the in-cylinder pressure sensors, the torque parameter of the failure-determined cylinder is calculated based on the detection value (s) from the other in-cylinder pressure sensor(s). This makes it possible to continuously calculate the torque parameter of the failure-determined cylinder and the total torque parameter of the engine with high accuracy, and therefore, it is possible to continuously perform engine torque control and the like using the total torque parameter with high accuracy.

Preferably, the combustion state parameter calculation method further comprises a hysteresis amount-calculating step of calculating a hysteresis amount indicative of the magnitude of deviation of the detection value from the in-cylinder pressure sensor from the actual in-cylinder pressure, and the failure determining step determines, when the calculated hysteresis amount is larger than a predetermined value, that the characteristic abnormality failure has occurred in the in-cylinder pressure sensor.

With this configuration, the magnitude of deviation of the detection value from the in-cylinder pressure sensor from the actual in-cylinder pressure is calculated as the hysteresis amount, and when the hysteresis amount is larger than the predetermined value, it is determined that the characteristic abnormality failure has occurred in the in-cylinder pressure sensor. This makes it possible to properly determine occurrence of the characteristic abnormality failure, and it is possible to accurately calculate the first combustion state parameter and the total torque parameter while eliminating influence of the deviation of the detection value from the actual in-cylinder pressure, according to a result of determination of the characteristic abnormality failure.

To attain the above object, in a second aspect of the present invention, there is provided a combustion state parameter calculation method for an internal combustion engine, which calculates, based on detection values from a plurality of in-cylinder pressure sensors provided in at least two cylinders of the engine, each for detecting in-cylinder pressure which is pressure in a cylinder associated therewith, a combustion state parameter indicative of a combustion state in the cylinder, comprising a second combustion state parameter-calculating step of calculating, as the combustion state parameter, a second combustion state parameter dependent on a state of change in the in-cylinder pressure with respect to a crank angle of the engine and expressed by the crank angle, based on the detection value from the in-cylinder pressure sensor, on a cylinder-by-cylinder basis, and a failure determining step of determining whether or not a characteristic abnormality failure in which the magnitude of the detection value from the in-cylinder pressure sensor deviates from an actual in-cylinder pressure has occurred, on an in-cylinder pressure sensor-by-in-cylinder pressure sensor basis, wherein even when it is determined that the characteristic abnormality failure has occurred in at least one of the in-cylinder pressure sensors, the second combustion state parameter-calculating step calculates the second combustion state parameter of a cylinder provided with the at least one of the in-cylinder pressure sensors, based on the detection value from the at least one of the in-cylinder pressure sensors.

With this configuration, based on the detection values from the in-cylinder pressure sensors provided in at least two cylinders of the engine, the second combustion state parameter which is dependent on a state of change in in-cylinder pressure with respect to the crank angle of the engine and is expressed by the crank angle is calculated as the combustion state parameter indicative of the combustion state in the cylinder, on a cylinder-by-cylinder basis. Further, it is determined whether or not the characteristic abnormality failure has occurred in any in-cylinder pressure sensor. Then, even in a case where it is determined that the characteristic abnormality failure has occurred in at least one of the in-cylinder pressure sensors, the second combustion state parameter of the failure-determined cylinder is calculated based on the detection value from the in-cylinder pressure sensor of the failure-determined cylinder.

As described above, differently from the first combustion state parameter dependent on the magnitude of the in-cylinder pressure, the second combustion state parameter is dependent on the state of change in in-cylinder pressure with respect to the crank angle of the engine, and is expressed by the crank angle. For example, the maximum in-cylinder pressure angle at which the maximum value of the in-cylinder pressure is obtained, a crank angle at which a predetermined combustion mass rate (e.g. MFB 50) is obtained, and the like, correspond to the second combustion state parameter. Therefore, even in a case where the characteristic abnormality failure has occurred in the in-cylinder pressure sensor, causing the detection value from the in-cylinder pressure sensor in failure to deviate from the actual in-cylinder pressure (true value), when the detection value properly reflects the state of change in in-cylinder pressure with respect to the crank angle, the second combustion state parameter can be obtained with higher accuracy based on the detection value from the in-cylinder pressure sensor determined to be in failure than based on the detection value (s) from the other in-cylinder pressure sensor(s).

From the above viewpoint, even when it is determined that the characteristic abnormality failure has occurred in the in-cylinder pressure sensor, the second combustion state parameter of the failure-determined cylinder is calculated based on the detection value from the in-cylinder pressure sensor associated therewith. This makes it possible to continuously calculate the second combustion state parameter while maintaining the accuracy of the calculated parameter, and therefore, it is possible to continuously perform engine control and the like using the second combustion state parameter with high accuracy.

Further, to attain the above object, in a third aspect of the present invention, there is provided a combustion state parameter calculation method for an internal combustion engine, which calculates, based on detection values from a plurality of in-cylinder pressure sensors provided in at least two cylinders of the engine, each for detecting in-cylinder pressure which is pressure in a cylinder associated therewith, a combustion state parameter indicative of a combustion state in the cylinder, comprising a combustion state parameter-calculating step of calculating, as the combustion state parameter, a plurality of types of combustion state parameters including a first combustion state parameter dependent on the magnitude of the in-cylinder pressure and a second combustion state parameter dependent on a state of change in the in-cylinder pressure with respect to a crank angle of the engine and expressed by the crank angle, based on the detection value from the in-cylinder pressure sensor, on a cylinder-by-cylinder basis, and a failure determining step of determining whether or not a characteristic abnormality failure in which the magnitude of the detection value from the in-cylinder pressure sensor deviates from an actual in-cylinder pressure has occurred, on an in-cylinder pressure sensor-by-in-cylinder pressure sensor basis, wherein when it is determined that the characteristic abnormality failure has occurred in at least one of the in-cylinder pressure sensors, and has not occurred in at least one of the other of the in-cylinder pressure sensors, the combustion state parameter-calculating step selects, when calculating the combustion state parameter of a cylinder provided with the at least one of the in-cylinder pressure sensors, the detection value from the at least one of the in-cylinder pressure sensors or the detection value from the at least one of the other of the in-cylinder pressure sensors, according to the type of the combustion state parameter.

With this configuration, based on the detection values from the in-cylinder pressure sensors provided in at least two cylinders of the engine, the plurality of types of combustion state parameters including the above-described first combustion parameter and second combustion parameter are calculated as the combustion state parameter, on a cylinder-by-cylinder basis. Further, it is determined whether or not the characteristic abnormality failure has occurred in any of the in-cylinder pressure sensors.

Further, according to the present invention, in a case where it is determined that the characteristic abnormality failure has occurred in part of the in-cylinder pressure sensors, when calculating the combustion state parameter of the failure-determined cylinder, the detection value from the part of the in-cylinder pressure sensors or the detection from the other in-cylinder pressure sensor which is determined to be free from the characteristic abnormality failure is selected according to the type of the combustion parameter. This makes it possible to properly select the detection value from the in-cylinder pressure sensor, which properly reflects the combustion state in the cylinder, according to the type of the combustion state parameter, and therefore, it is possible to continuously calculate the first and second combustion state parameters while maintaining the accuracy of the calculated parameters. As a result, it is possible to continuously perform control including the engine control using the two combustion state parameters with high accuracy.

Preferably, the failure determining step is configured to determine, in addition to whether or not the characteristic abnormality failure has occurred, whether or not a fixed output failure has occurred in which the detection value from the in-cylinder pressure sensor does not change in response to a change in the actual in-cylinder pressure, and the combustion state parameter calculation method further comprises a calculation inhibiting step of inhibiting, when it is determined that the fixed output failure has occurred in the at least one of the in-cylinder pressure sensors, calculation of the second combustion state parameter based on the detection value from the at least one of the in-cylinder pressure sensors.

In the case where the failure of the in-cylinder pressure sensor is the above-mentioned fixed output failure, the detection value does not change even when the actual in-cylinder pressure changes, and hence even if the second combustion state parameter is calculated based on this detection value, valid calculation of the second combustion state parameter cannot be performed. With the configuration of the preferred embodiment, when the failure is determined to be the fixed output failure, calculation of the second combustion state parameter based on the detection value from the in-cylinder pressure sensor determined to be in failure is inhibited, and hence it is possible to positively avoid miscalculation of the second combustion state parameter.

Preferably, the failure determining step is configured to determine, in addition to whether or not the characteristic abnormality failure has occurred, whether or not a phase deviation failure has occurred in which a relationship between the crank angle and the detection value from the in-cylinder pressure sensor deviates from a relationship between the crank angle and the actual in-cylinder pressure, and the combustion state parameter calculation method further comprises a calculation inhibiting step of inhibiting, when it is determined that the phase deviation failure has occurred in the at least one of the in-cylinder pressure sensors, calculation of the second combustion state parameter based on the detection value from the at least one of the in-cylinder pressure sensors.

In the case where the failure of the in-cylinder pressure sensor is the above-mentioned phase deviation failure, the relationship between the crank angle and the detection value from the in-cylinder pressure sensor deviates from the relationship between the crank angle and the actual in-cylinder pressure, and hence even when the second combustion state parameter is calculated based on this detection value, valid calculation of the second combustion state parameter cannot be performed. With the configuration of the preferred embodiment, when the failure is determined to be the phase deviation failure, calculation of the second combustion state parameter based on the detection value from the in-cylinder pressure sensor determined to be in failure is inhibited, and hence it is possible to positively avoid miscalculation of the second combustion state parameter.

Preferably, the engine is configured to perform a cylinder resting operation for stopping combustion in part of the cylinders when predetermined conditions are satisfied, and the combustion state parameter calculation method further comprises a determination inhibiting step of inhibiting, when the cylinder resting operation is being performed, failure determination of the in-cylinder pressure sensor provided in the part of the cylinders in which combustion is stopped.

In the case where the cylinder resting operation is performed, in the cylinder in which combustion is stopped, the in-cylinder pressure varies according to the movement of a piston which reciprocates within the cylinder, and hence the magnitude of the in-cylinder pressure and the period of variation thereof show obviously different behaviors from those of the in-cylinder pressure of a cylinder in which combustion is being performed. With the configuration of the preferred embodiment, when the cylinder resting operation is being performed, determination of a failure of the in-cylinder pressure sensor provided in the cylinder in which combustion is stopped is inhibited, and hence it is possible to avoid erroneous failure determination.

The above and other objects, features, and advantages of the present invention will become more apparent from the following detailed description taken in conjunction with the accompanying drawings.

DETAILED DESCRIPTION OF PREFERRED EMBODIMENTS

Figure 1:
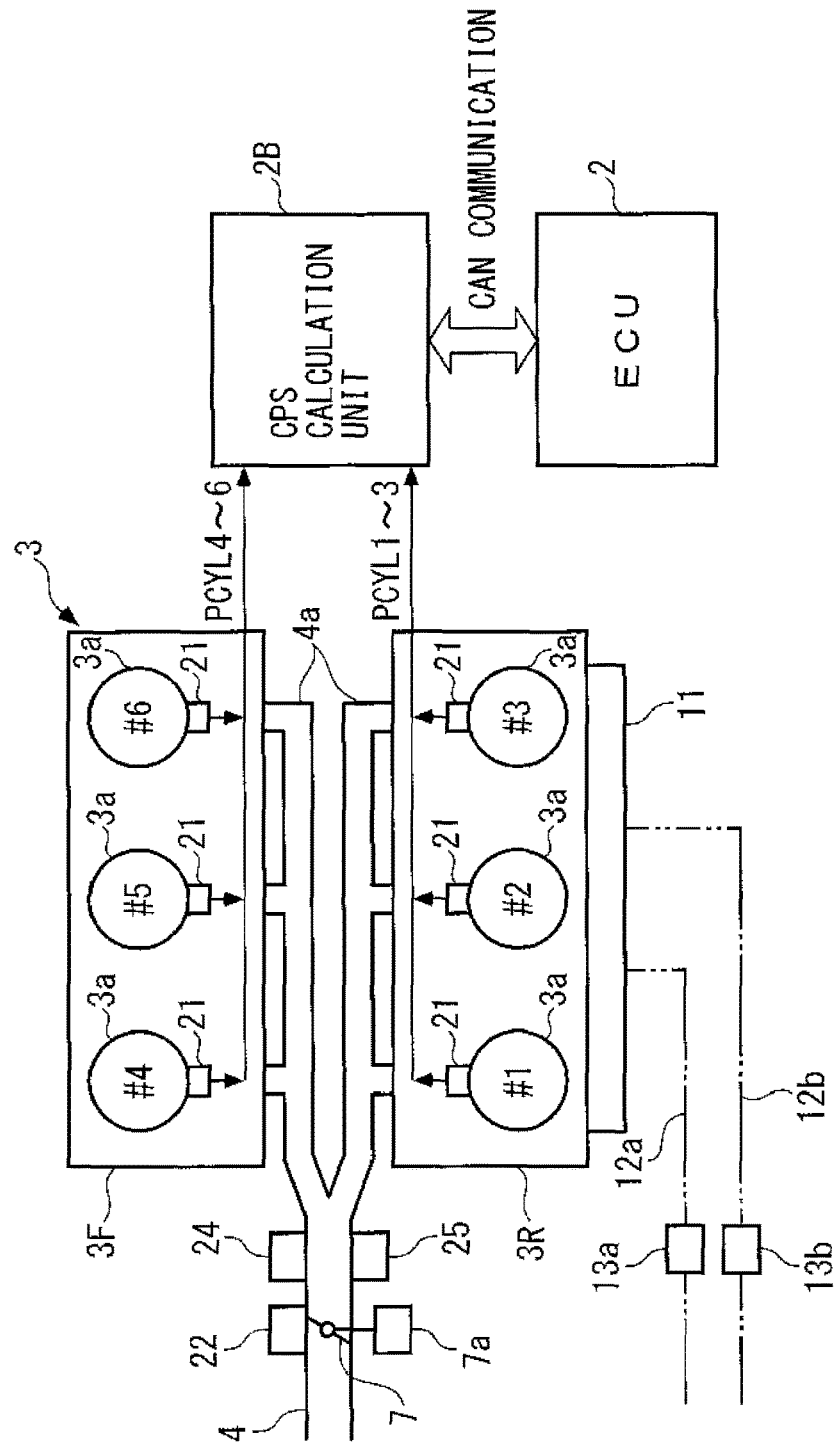
FIG. 1 is a schematic diagram of an internal combustion engine and a device based on a combustion state parameter calculation method to which the present invention is applied.

The invention will now be described in detail with reference to drawings showing a preferred embodiment thereof. FIG. 1 schematically shows a device based on a combustion state parameter calculation method to which the present invention is applied together with an internal combustion engine (hereinafter referred to as the "engine") 3. The engine 3 is e.g. a V-type six-cylinder DOHC engine, which is installed on a vehicle, not shown, and a rear bank 3R and a front bank 3F are each provided with three cylinders 3a (#1 to #3 and #4 to #6).

An intake pipe 4 is connected to each cylinder 3a via an intake manifold 4a, and an exhaust pipe is connected to each cylinder 3a via an exhaust manifold (neither of which is shown). Further, each cylinder 3a is provided with an intake valve and an exhaust valve (neither of which is shown). The intake pipe 4 is provided with a throttle valve 7. An opening degree θTH of the throttle valve 7 (hereinafter referred to as the "throttle valve opening θTH") is controlled via a TH actuator 7a by a drive signal delivered from an electronic control unit (hereinafter referred to as the "ECU") 2, whereby the amount of intake air drawn into the cylinder 3a is controlled. Further, the throttle valve opening θTH is detected by a throttle valve opening sensor 22, and a signal indicative of the detected throttle valve opening θTH is input to the ECU 2.

Figure 2:
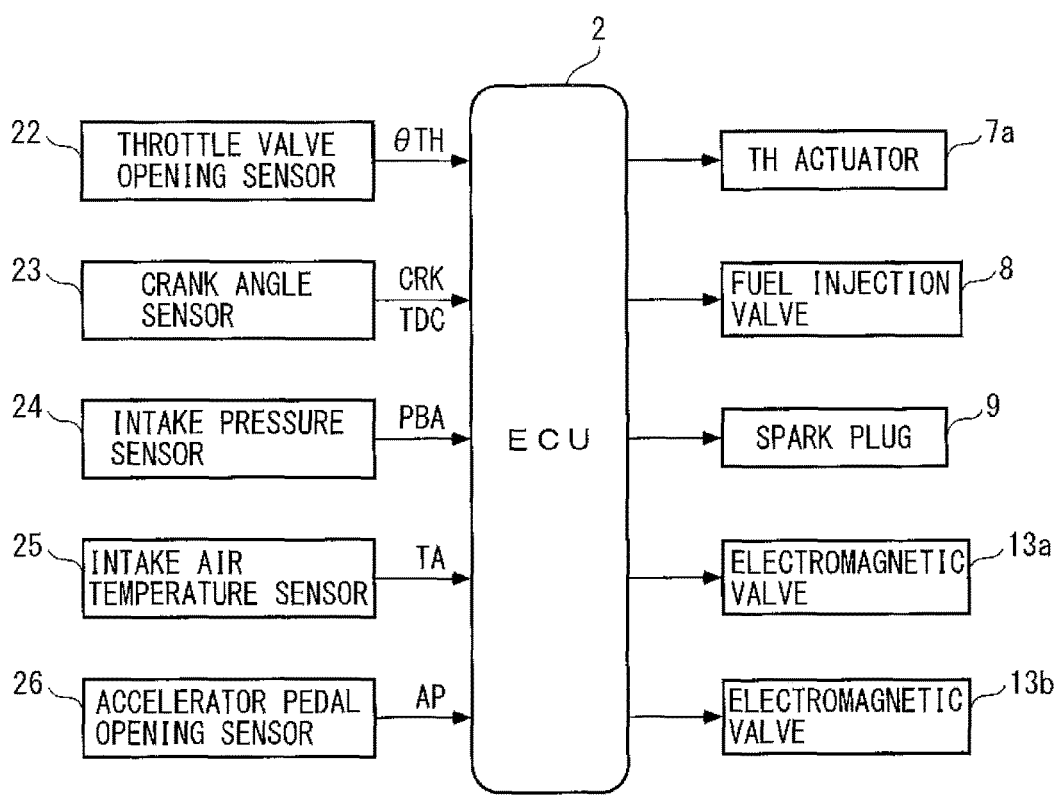
FIG. 2 is a block diagram of a control system of the engine.

Further, each cylinder 3a is provided with a fuel injection valve 8 and a spark plug 9 (see FIG. 2). The fuel injection valve 8 is a direct injection type that directly injects fuel into the cylinder 3a. The spark plug 9 performs an ignition operation by electrical discharge in the cylinder 3a, whereby a mixture of fuel injected into the cylinder 3a and intake air is burned. The amount and timing of fuel injection by the fuel injection valve 8, and ignition timing θIG of the spark plug 9 are controlled by a drive signal delivered from the ECU 2.

Further, each cylinder 3a is provided with an in-cylinder pressure sensor 21 for detecting in-cylinder pressure which is pressure within the cylinder 3a. The in-cylinder pressure sensor 21 is e.g. an integral type which is provided integrally with the fuel injection valve 8, and includes a pressure detection element disposed at a front end portion of the fuel injection valve 8, and an amplification circuit unit (neither of which is shown). The pressure detection element detects a rate of change in an in-cylinder pressure PCYL, and the amplification circuit unit filters and amplifies a detection signal output from the pressure detection element, and converts the signal to the in-cylinder pressure PCYL.

The detection signals indicative of the in-cylinder pressures PCYL1 to PCYL6 of the cylinders #1 to #6, which are detected by the respective in-cylinder pressure sensors 21, are input to a CPS calculation unit 2B. This CPS calculation unit 2B performs calculation of a combustion state parameter indicative of the combustion state in each cylinder 3a and the like, based on the input in-cylinder pressures PCYL1 to PCYL6. As described hereinafter, in the present embodiment, an illustrated average effective pressure PMI is calculated as a first combustion state parameter, and a maximum in-cylinder pressure angle θPmax which is a crank angle at which the maximum value Pmax of the in-cylinder pressure PCYL (maximum in-cylinder pressure) is obtained is calculated as a second combustion state parameter.

As shown in FIG. 2, the CPS calculation unit 2B and the ECU 2 are connected by CAN communication, and exchange of data between the CPS calculation unit 2B and the ECU 2 is performed by CAN communication. Data indicative of the illustrated average effective pressure PMI and the maximum in-cylinder pressure angle θPmax calculated by the CPS calculation unit 2B are also transmitted to the ECU 2 by CAN communication.

The rear bank 3R of the engine 3 is provided with a cylinder resting mechanism 11. The cylinder resting mechanism 11 is e.g. a hydraulic type, and is connected to a hydraulic pump (not shown) via two oil passages 12a and 12b for the intake valves and the exhaust valves. Further, electromagnetic valves 13a and 13b are disposed in respective intermediate portions of the oil passages 12a and 12b.

When predetermined conditions of the cylinder resting operation are satisfied, supply of fuel to the cylinders #1 to #3 of the rear bank 3R is stopped, and the electromagnetic valves 13a and 13b are opened by drive signals delivered from the ECU 2. This cause the cylinder resting mechanism 11 to be operated by hydraulic pressure supplied through the oil passages 12a and 12b, to disconnect each intake valve and an intake cam associated therewith (not shown) and each exhaust valve and an exhaust cam associated therewith (not shown) from each other, whereby the intake valves and the exhaust valves of the cylinders #1 to #3 are held in a valve-closed state.

The engine 3 is provided with a crank angle sensor 23. The crank angle sensor 23 delivers a CRK signal and a TDC signal, which are pulse signals, to the ECU 2 along with rotation of a crankshaft, not shown, of the engine 3. The CRK signal is output whenever the crankshaft rotates through a predetermined crank angle (e.g. 1°). The ECU 2 calculates a rotational speed NE of the engine 3 (hereinafter referred to as the "engine speed NE") based on the CRK signal.

Further, the TDC signal is a signal indicating that a piston (not shown) of the engine 3 is at a predetermined crank angle position slightly before the TDC position of an intake stroke of the piston, and in a case where the engine 3 is a six-cylinder engine as in the present embodiment, the TDC signal is delivered every 120 degrees of the crank angle. According to the TDC signal and the CRK signal, the ECU 2 calculates the crank angle CA determined with reference to the output timing of the TDC signal for each cylinder 3a.

Further, an intake pressure sensor 24 and an intake air temperature sensor 25 are provided in the intake pipe 4 at respective locations downstream of the throttle valve 7. The intake pressure sensor 24 detects a pressure PBA of intake air (intake pressure PBA) drawn into the cylinder 3a as an absolute pressure, and the intake air temperature sensor 25 detects a temperature TA of intake air (intake air temperature TA). These detection signals are input to the ECU 2. Further, to the ECU 2, an accelerator pedal opening sensor 26 inputs a detection signal indicative of an operation amount AP of an accelerator pedal (not shown) of the vehicle (hereinafter referred to as the "accelerator pedal opening AP").

The CPS calculation unit 2B and the ECU 2 are each implemented by a microcomputer comprised of an I/O interface, a CPU, a RAM, and a ROM. Further, the ECU 2 controls the engine 3 by controlling the throttle valve opening θTH, the amount of fuel injected from each fuel injection valve 8, the ignition timing θIG of each spark plug 9, and so forth, according to the detection signals output from the above-mentioned various sensors 22 to 26, data of the combustion state parameters sent from the CPS calculation unit 2B, and so forth.

FIGS. 3 to 6 are a failure determination process performed by the CPS calculation unit 2B for determining a failure of the in-cylinder pressure sensor 21. The failure determination process is performed in synchronism with generation of the CRK signal for each in-cylinder pressure sensor 21.

Figure 3:
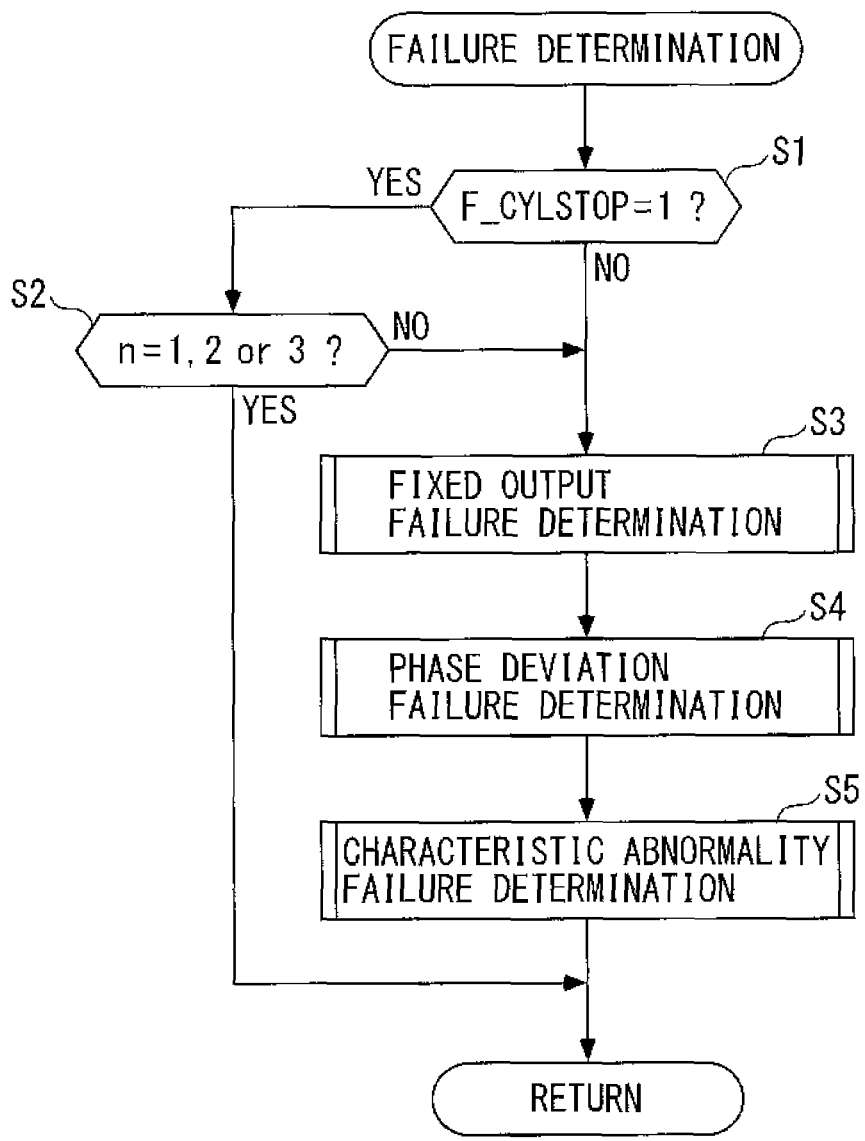
FIG. 3 is a main flowchart of a process for determining a failure of an in-cylinder pressure sensor.

FIG. 3 shows a main flowchart of the failure determination process. In the present process, first, in a step 1 (shown as S1 in abbreviated form; the following steps are also shown in abbreviated form), it is determined whether or not a cylinder resting flag F_CYLSTOP is equal to 1. The cylinder resting flag F_CYLSTOP is set to 1 when the above-mentioned cylinder resting operation with respect to the rear bank 3R is being performed.

If the answer to the question of the step 1 is affirmative (YES), i.e. if the cylinder resting operation is being performed, it is determined whether or not an index number n indicative of the number (#1 to #6) of an in-cylinder pressure sensor 21 and a cylinder 3a, as a target of the failure determination process at the time, is equal to one of 1 to 3 (step 2). If the answer to the question of the step 2 is affirmative (YES), i.e. if the target of failure determination at the time is one of the in-cylinder pressure sensors 21 of the cylinders #1 to #3, failure determination is not executed, followed by terminating the present process. As described above, during execution of the cylinder resting operation, failure determination of the in-cylinder pressure sensors 21 of the cylinders #1 to #3 in which combustion is stopped, is inhibited, whereby it is possible to positively avoid erroneous failure determination.

If the answer to the question of the step 2 is negative (NO), i.e. if the target of failure determination is one of the in-cylinder pressure sensors 21 of the cylinders #4 to #6, or if the answer to the question of the step 1 is negative (NO), i.e. if the cylinder resting operation is not being performed, processes for determining a fixed output failure, a phase deviation failure, and a characteristic abnormality failure, which are three different failure patterns, are performed in steps 3 to 5, respectively, followed by terminating the present process.

Figure 4:
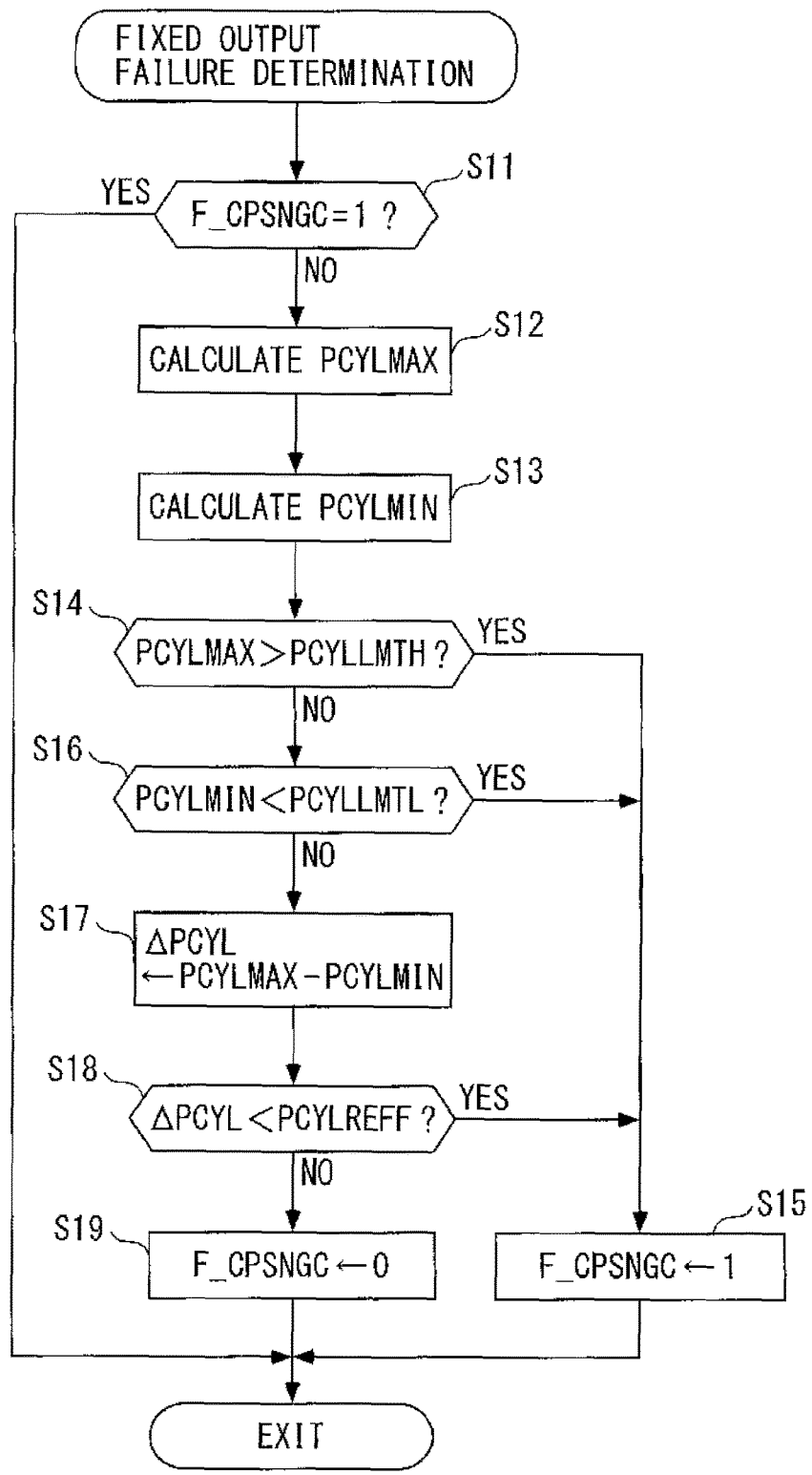
FIG. 4 is a flowchart of a fixed output failure determination process.

FIG. 4 shows a subroutine for a fixed output failure determination process. The fixed output failure is a failure in a pattern in which in spite of a change in the actual in-cylinder pressure, the detection value PCYL (output) from the in-cylinder pressure sensor 21 indicates a substantially fixed value (hardly changes) due to occurrence of short-circuit or disconnection.

In the present process, first, in a step 11, it is determined whether or not a fixed output failure flag F_CPSNGC is equal to 1. If the answer to the question of the step 11 is affirmative (YES), i.e. if it has already been determined by the present process that the fixed output failure has occurred, the present process is immediately terminated.

If the answer to the question of the step 11 is negative (NO), an in-cylinder pressure maximum value PCYLMAX and an in-cylinder pressure minimum value PCYLMIN are calculated in steps 12 and 13, respectively. Calculation of the in-cylinder pressure maximum value PCYLMAX is performed e.g. every one combustion cycle. More specifically, the detection value PCYL from the in-cylinder pressure sensor 21 at the start of one combustion cycle is set as an initial value of the in-cylinder pressure maximum value PCYLMAX, and the in-cylinder pressure maximum value PCYLMAX is replaced by the detection value PCYL for update whenever the detection value PCYL exceeds the in-cylinder pressure maximum value PCYLMAX until the one combustion cycle comes to the end, whereby the in-cylinder pressure maximum value PCYLMAX is calculated.

Similarly, calculation of the in-cylinder pressure minimum value PCYLMIN is performed such that the detection value PCYL from the in-cylinder pressure sensor 21 at the start of one combustion cycle is set as an initial value of the in-cylinder pressure minimum value PCYLMIN, and the in-cylinder pressure minimum value PCYLMIN is replaced by the detection value PCYL for update whenever the detection value PCYL becomes lower than the in-cylinder pressure minimum value PCYLMIN until the one combustion cycle comes to the end.

Next, it is determined whether or not the calculated in-cylinder pressure maximum value PCYLMAX is larger than a predetermined upper limit value PCYLLMTH (step 14). If the answer to the question of the step 14 is affirmative (YES), i.e. if PCYLMAX>PCYLLMTH holds, it is determined that a fixed output failure has occurred in which the detection value PCYL from the in-cylinder pressure sensor 21 indicates a too large fixed value e.g. due to short-circuit on a power supply side, so that the fixed output failure flag F_CPSNGC is set to 1 (step 15), followed by terminating the present process.

If the answer to the question of the step 14 is negative (NO), it is determined whether or not the calculated in-cylinder pressure minimum value PCYLMIN is smaller than a predetermined lower limit value PCYLLMTL (step 16). If the answer to the question of the step 16 is affirmative (YES), i.e. if PCYLMIN<PCYLLMTL holds, it is determined that a fixed output failure has occurred in which the detection value PCYL from the in-cylinder pressure sensor 21 indicates a too small fixed value e.g. due to short-circuit on a ground side, and the process proceeds to the step 15, wherein the fixed output failure flag F_CPSNGC is set to 1, followed by terminating the present process.

If the answer to the question of the step 16 is negative (NO), a difference between the in-cylinder pressure maximum value PCYLMAX and the in-cylinder pressure minimum value PCYLMIN is calculated as an in-cylinder pressure difference ΔPCYL (step 17), and it is determined whether or not the in-cylinder pressure difference ΔPCYL is smaller than a predetermined value PCYLREFF for fixation determination (step 18).

If the answer to the question of the step 18 is affirmative (YES), i.e. if the difference between the in-cylinder pressure maximum value PCYLMAX and the in-cylinder pressure minimum value PCYLMIN is very small, it is determined that a fixed output failure has occurred in which the detection value PCYL from the in-cylinder pressure sensor 21 is fixed to a substantially fixed value e.g. due to a cause other than the above-mentioned short-circuit on the power supply side or the ground side, and the process proceeds to the step 15, wherein the fixed output failure flag F_CPSNGC is set to 1, followed by terminating the present process.

On the other hand, if the answer to the question of the step 18 is negative (NO), it is determined that a fixed output failure has not occurred, and the fixed output failure flag F_CPSNGC is set to 0 (step 19), followed by terminating the present process.

Figure 5:
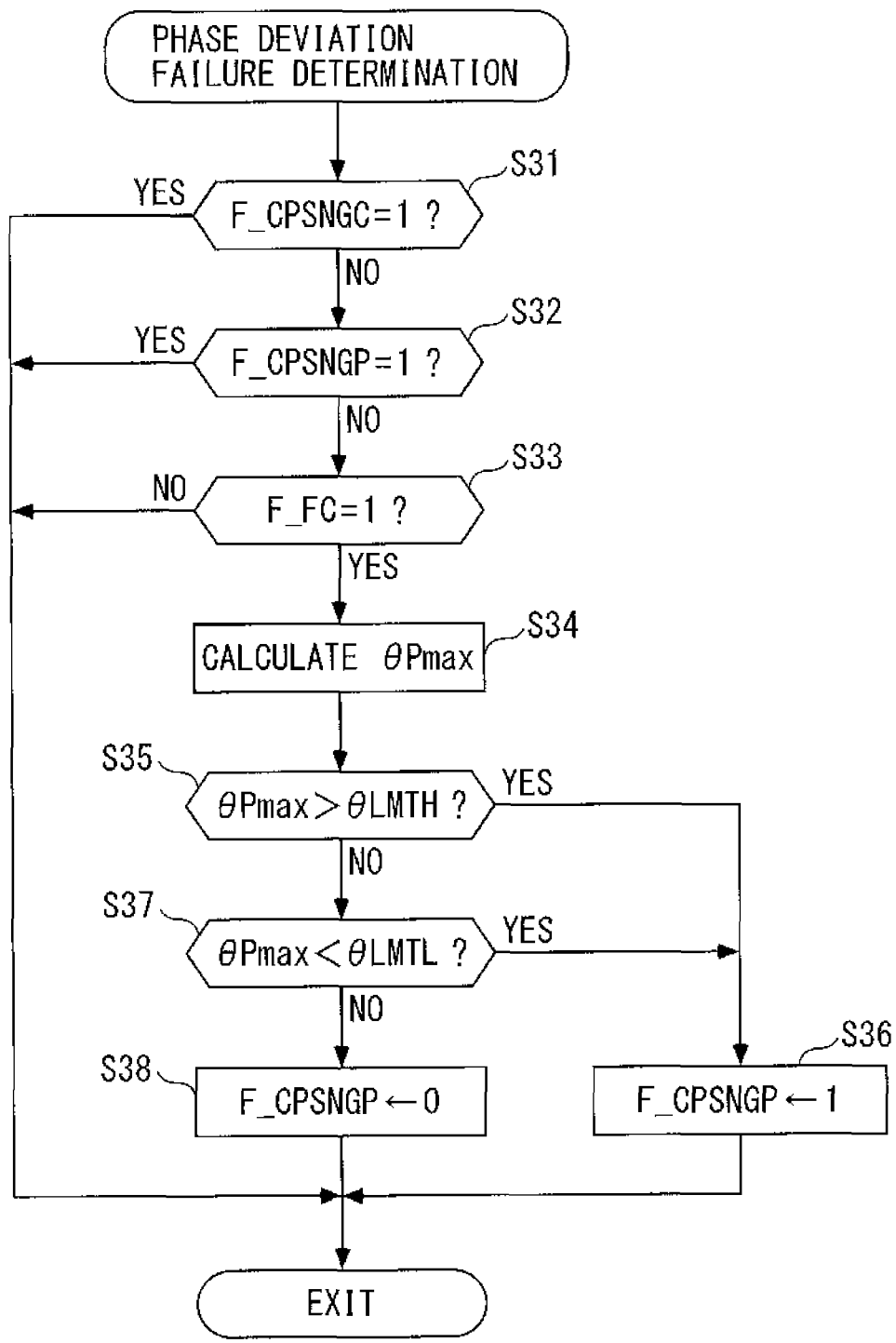
FIG. 5 is a flowchart of a phase deviation failure determination process.

FIG. 5 shows a subroutine for a phase deviation failure determination process performed in the step 4 in FIG. 3. The phase deviation failure is a failure in a pattern in which although the magnitude of the detection value PCYL from the in-cylinder pressure sensor 21 is a proper one, a relationship (phase) between the crank angle CA and the detection value PCYL deviates from a relationship between the crank angle CA and the actual in-cylinder pressure.

In the present process, first, it is determined in steps 31 and 32 whether or not the fixed output failure flag F_CPSNGC and a phase deviation failure flag F_CPSNGP are equal to 1, respectively. If the answer to the question of the step 31 or 32 is affirmative (YES), i.e. if it is determined in the determination process in FIG. 4 that a fixed output failure has occurred, or it has already been determined by the present process that the phase deviation failure has occurred, the present process is immediately terminated.

If the answers to the questions of the step 31 and 32 are both negative (NO), it is determined whether or not a fuel cut flag F_FC is equal to 1 (step 33). If the answer to the question of the step 33 is negative (NO), i.e. if it is not during a fuel cut operation for stopping supply of fuel to the cylinders 3a, the present process is immediately terminated.

If the answer to the question of the step 33 is affirmative (YES), i.e. if it is during the fuel cut operation, the maximum in-cylinder pressure angle θPmax is calculated (step 34). Calculation of the maximum in-cylinder pressure angle θPmax is performed e.g. in an expansion stroke by updating a maximum in-cylinder pressure Pmax in a similar manner to the case of the in-cylinder pressure maximum value PCYLMAX in the above-described process in FIG. 4, storing the crank angle CA at the time, and determining the stored crank angle CA as the maximum in-cylinder pressure angle θPmax when the maximum in-cylinder pressure Pmax is finally determined at the end of the expansion stroke.

Next, it is determined whether or not the calculated maximum in-cylinder pressure angle θPmax is larger than a predetermined upper limit value θLMTH (step 35). If the answer to the question of the step 35 is affirmative (YES), i.e. if θPmax>θLMTH holds, it is determined that the phase deviation failure has occurred in the in-cylinder pressure sensor 21, and the phase deviation failure flag F_CPSNGP is set to 1 (step 36), followed by terminating the present process.

Further, if the answer to the question of the step 35 is negative (NO), it is determined whether or not the maximum in-cylinder pressure angle θPmax is smaller than a predetermined lower limit value θLMTL (step 37). If the answer to the question of the step 37 is affirmative (YES), i.e. if θPmax<θLMTL holds, it is also determined that the phase deviation failure has occurred in the in-cylinder pressure sensor 21, and the process proceeds to the step 36, wherein the phase deviation failure flag F_CPSNGP is set to 1.

On the other hand, if the answer to the question of the step 37 is negative (NO), it is determined that the phase deviation failure has not occurred, and the phase deviation failure flag F_CPSNGP is set to 0 (step 38), followed by terminating the present process.

Figure 6:
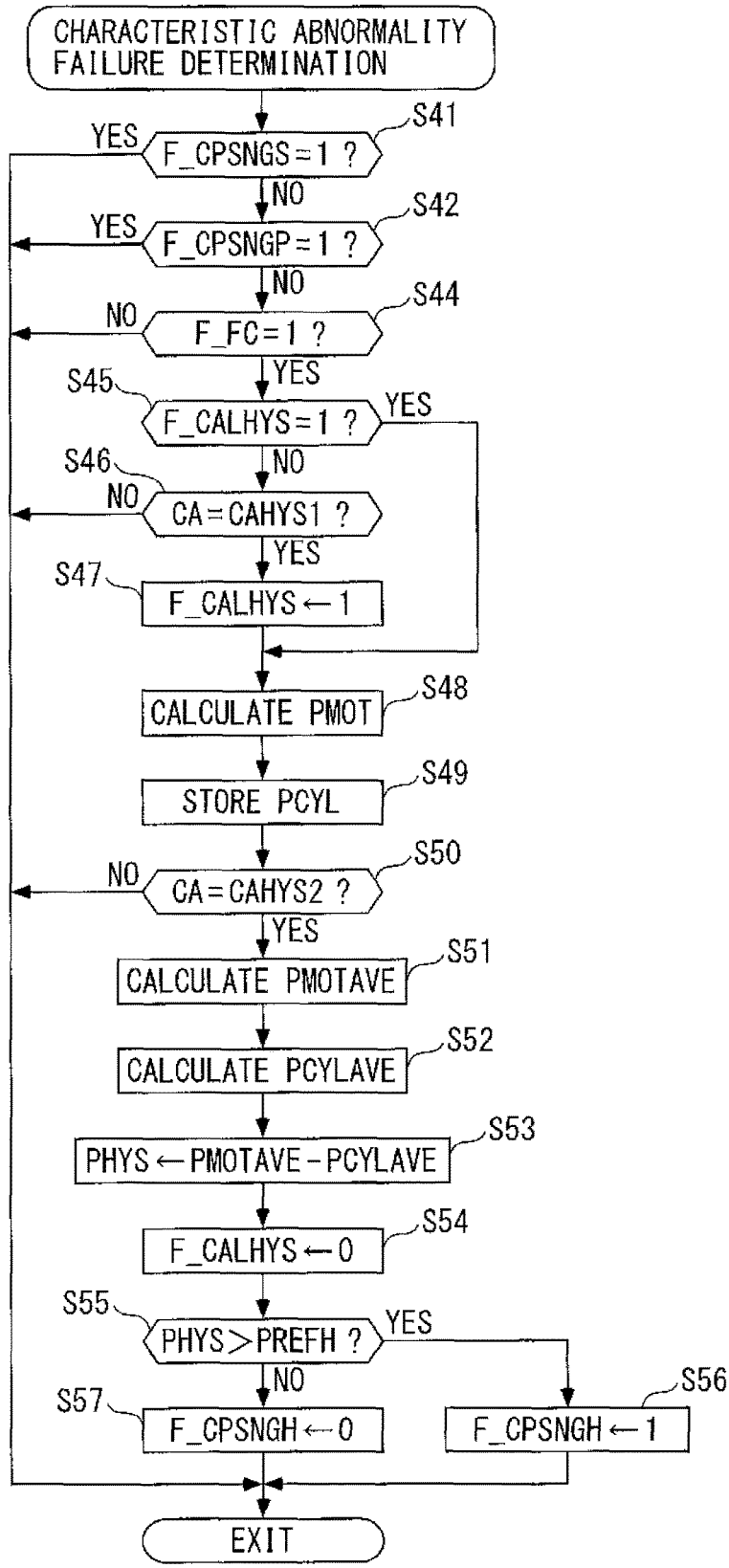
FIG. 6 is a flowchart of a characteristic abnormality failure determination process.

FIG. 6 shows a subroutine for a characteristic abnormality failure determination process performed in the step 5 in FIG. 3. The characteristic abnormality failure is a failure in a pattern in which the magnitude of the detection value PCYL from the in-cylinder pressure sensor 21 deviates from the actual in-cylinder pressure. The characteristic abnormality failure includes not only a failure caused by deviation or drift (zero point shift) of a gain e.g. due to deterioration of the pressure detection element of the in-cylinder pressure sensor 21, but also a failure caused by other causes, described hereinafter.

In the present embodiment, first, it is determined in steps 41 and 42 whether or not the fixed output failure flag F_CPSNGC and the phase deviation failure flag F_CPSNGP are equal to 1, respectively. If one of the answers to the questions of the steps 41 and 42 is affirmative (YES), i.e. if it is determined in the determination processes in FIGS. 4 and 5 that the fixed output failure or the phase deviation failure has occurred, the present process is immediately terminated.

If the answers to the questions of the steps 41 and 42 are both negative (NO), it is determined whether or not the fuel cut flag F_FC is equal to 1 (step 44). If the answer to the question of the step 44 is negative (NO), i.e. if it is not during the fuel cut operation, the present process is immediately terminated.

If the answer to the question of the step 44 is affirmative (YES), i.e. if it is during the fuel cut operation, a hysteresis amount PHYS is calculated in a step 45 et seq. The hysteresis amount PHYS represents the magnitude of a deviation of the detection value PCYL from the in-cylinder pressure sensor 21 from the actual in-cylinder pressure, and is calculated in a predetermined calculation section extending before and after the start of an exhaust stroke.

First, in the step 45, it is determined whether or not an in-calculation flag F_CALHYS indicating that the hysteresis amount PHYS is being calculated is equal to 1. If the answer to the question of the step 45 is negative (NO), i.e. if the hysteresis amount PHYS is not being calculated, it is determined whether or not the crank angle CA is equal to a first predetermined value CAHYS1 corresponding to the start of the calculation section (step 46). If the answer to the question of the step 46 is negative (NO), the present process is immediately terminated.

On the other hand, if the answer to the question of the step 46 is affirmative (YES), calculation of the hysteresis amount PHYS is to be started, so that the in-calculation flag F_CALHYS is set to 1 (step 47), and the process proceeds to a step 48. Further, after execution of the step 47, the answer to the question of the step 45 becomes affirmative (YES), and in this case, the process directly proceeds to the step 48.

In the step 48, a motoring pressure PMOT is calculated. The motoring pressure PMOT is an in-cylinder pressure generated when combustion is not performed in the cylinder 3a, and is calculated according to an intake air amount QA, the intake air temperature TA, and a volume Vc of the cylinder 3a corresponding to the crank angle CA, using a gas state equation, and the calculated motoring pressure PMOT is stored. Further, the intake air amount QA is calculated according to the engine speed NE and the intake pressure PBA.

Next, the detection value PCYL from the in-cylinder pressure sensor 21 at that time is stored (step 49). The calculated motoring pressure PMOT and the detection value PCYL are stored in a plurality of storage areas for each crank angle CA.

Next, it is determined whether or not the crank angle CA is equal to a second predetermined value CAHYS2 corresponding to the end of the calculation section (step 50). If the answer to the question of the step 50 is negative (NO), the present process is immediately terminated.

On the other hand, if the answer to the question of the step 50 is affirmative (YES), the plurality of motoring pressures PMOT calculated and stored during the calculation section are read out, and an average value of the motoring pressures PMOT is calculated as a motoring pressure average value PMOTAVE (step 51). Further, the plurality of detection values PCYL from the in-cylinder pressure sensor 21 and stored in the calculation section are read out, and an average value of the detection values PCYL is calculated as an in-cylinder pressure average value PCYLAVE (step 52). Then, a difference between the calculated motoring pressure average value PMOTAVE and in-cylinder pressure average value PCYLAVE is calculated as the hysteresis amount PHYS (step 53).

Next, the in-calculation flag F_CALHYS is set to 0 (step 54), and it is determined whether or not the calculated hysteresis amount PHYS is larger than a predetermined value PREFH (step 55).

If the answer to the question of the step 55 is affirmative (YES), i.e. if PHYS>PREFH holds, a deviation of the detection value PCYL from the actual in-cylinder pressure is large, and hence it is determined that the characteristic abnormality failure has occurred in the in-cylinder pressure sensor 21, and a characteristic abnormality failure flag F_CPSNGH is set to 1 (step 56), followed by terminating the present process. On the other hand, if the answer to the question of the step 55 is negative (NO), it is determined that the characteristic abnormality failure has not occurred, and the characteristic abnormality failure flag F_CPSNGH is set to 0 (step 57), followed by terminating the present process.

Next, a description will be given of a process executed by the CPS calculation unit 2B, for calculating the illustrated average effective pressure PMI. The calculation process is for calculating the illustrated average effective pressure PMI according to a result of the above-described characteristic abnormality failure determination with respect to each of the rear bank 3R (cylinders #1 to #3) and the front bank 3F (cylinders #4 to #6) on a bank-by-bank basis. The same calculation process is performed for both the banks, and hence the following description will be given of a process for calculating an illustrated average effective pressure PMIBANKR of the rear bank 3R with reference to FIG. 7, on behalf of the two calculation processes. The present process is performed in synchronism with generation of the TDC signal.

In the present process, first, in a step 61, the illustrated average effective pressures PMI (n) (n=1 to 3) of the cylinders #1 to #3 are calculated, respectively, by the following equation:

$$PMI(n)=IMEP(n)+PMEP(n)$$

In this equation, IMEP represents an illustrated average effective pressure (positive value) during the compression and expansion strokes corresponding to work by combustion, and PMEP represents an illustrated average effective pressure (negative value) during the exhaust and intake strokes corresponding to a pump loss, which are calculated for each cylinder 3a by separate calculation processes (not shown) based on a relationship between the detection value PCYL from the in-cylinder pressure sensor 21 and the volume Vc of the cylinder 3a.

Next, it is determined whether or not the cylinder resting flag F_CYLSTOP is equal to 1 (step 62). If the answer to the question of the step 62 is affirmative (YES), i.e. if it is during the cylinder resting operation with respect to the rear bank 3R (cylinders #1 to #3), the illustrated average effective pressure PMIBANKR of the rear bank 3R is set to 0 (step 63), followed by terminating the present process.

On the other hand, if the answer to the question of the step 62 is negative (NO), i.e. if it is not during the cylinder resting operation, the illustrated average effective pressure PMIBANKR of the rear bank 3R is calculated according to a result of the characteristic abnormality failure determination.

First, in a step 64, it is determined whether or not a total value ΣF_CPSNGH (n) of the characteristic abnormality failure flag F_CPSNGH (n) set to each in-cylinder pressure sensor 21 in the determination process in FIG. 6 is equal to 0. If the answer to the question of the step 64 is affirmative (YES), i.e. if it is determined that none of the in-cylinder pressure sensors 21 of the cylinders #1 to #3 suffer from the characteristic abnormality failure, the illustrated average effective pressure PMI (n) calculated for each cylinder 3a in the step 61 is directly used, and the process proceeds to a step 70.

If the answer to the question of the step 64 is negative (NO), it is determined whether or not the above-mentioned failure flag total value ΣF_CPSNGH (n) is equal to 1 (step 65). If the answer to the question of the step 65 is affirmative (YES), i.e. if it is determined that the characteristic abnormality failure has occurred in one of the three in-cylinder pressure sensors 21 but has not occurred in the other two, the illustrated average effective pressures PMI of the one of the cylinders 3a provided with the in-cylinder pressure sensor 21 determined to be in failure (hereinafter referred to as the "failure-determined cylinder") is replaced by the average value of the illustrated average effective pressures PMI of the other two cylinders 3a (step 66).

For example, when it is determined that the characteristic abnormality failure has occurred in the in-cylinder pressure sensor 21 of the cylinder #1, and has not occurred in the in-cylinder pressure sensors 21 of the cylinders #2 and #3, the illustrated average effective pressure PMI (1) of the cylinder #1 which is the failure-determined cylinder is calculated by PMI (1)=(PMI (2)+PMI (3))/2.

If the answer to the question of the step 65 is negative (NO), it is determined whether or not the failure flag total value ΣF_CPSNGH (n) is equal to 2 (step 67). If the answer to the question of the step 67 is affirmative (YES), i.e. if it is determined that the characteristic abnormality failure has occurred in two of the three in-cylinder pressure sensors 21 but has not occurred in the other one, the illustrated average effective pressures PMI of the two failure-determined cylinders are replaced by the illustrated average effective pressure PMI of the other one cylinder 3a (step 68).

For example, when it is determined that the characteristic abnormality failure has occurred in the in-cylinder pressure sensors 21 of the cylinders #1 and #2, but has not occurred in the in-cylinder pressure sensor 21 of the cylinder #3, the illustrated average effective pressures PMI (1) and PMI (2) of the cylinders #1 and #2 are calculated by PMI (1)=PMI (3) and by PMI (2)=PMI (3), respectively.

If the answer to the question of the step 67 is negative (NO), i.e. if it is determined that the failure flag total value ΣF_CPSNGH (n) is equal to 3, which means that the characteristic abnormality failure has occurred in all of the in-cylinder pressure sensors 21 of the cylinders #1 to #3, the illustrated average effective pressures PMI (1) to PMI (3) of the cylinders #1 to #3 are all set to 0 (step 69).

In a step 70 following the step 64, 66, 68, or 69, a sum of the illustrated average effective pressures PMI (1) to PMI (3) of the cylinders #1 to #3, which have been calculated so far, is calculated as the illustrated average effective pressure PMIBANKR of the rear bank 3R, followed by terminating the present process. As mentioned above, an illustrated average effective pressure PMIBANKF of the front bank 3F having the cylinders #4 to #6 is also calculated in a similar manner to the above.

Figure 8:
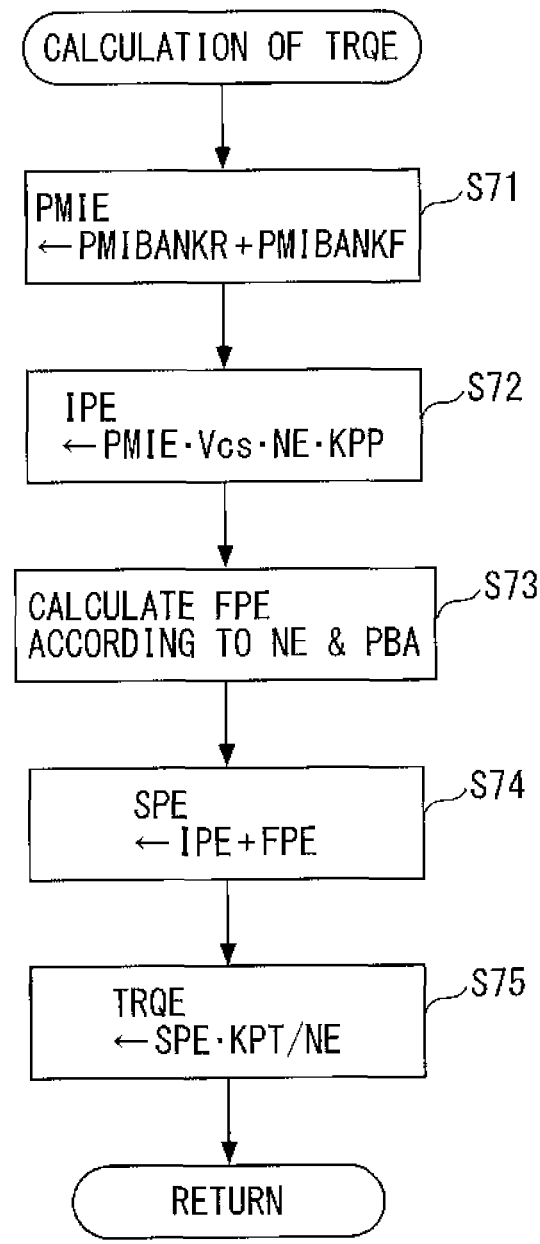
FIG. 8 is a flowchart of an engine torque calculation process.

FIG. 8 shows a process performed by the ECU 2, for calculating an engine torque TRQE. The present process is for calculating a net torque output from the engine 3 as the engine torque TRQE, based on the illustrated average effective pressures PMIBANKR and PMIBANKF of the rear and front banks 3R and 3F which are calculated as described above.

In the present process, first, in a step 71, an illustrated average effective pressure PMIE of the entire engine 3 is calculated by adding up the illustrated average effective pressures PMIBANKR and PMIBANKF of the rear and front banks 3R and 3F. Next, an illustrated output (horse power) IPE of the engine 3 is calculated by multiplying the illustrated average effective pressure PMIE by a stroke capacity Vcs per one cylinder, the engine speed NE, and a predetermined conversion coefficient KPP (step 72).

Next, a friction output FPE (negative value) of the engine 3 is calculated by searching a predetermined map (not shown) according to the engine speed NE and the intake pressure PBA (step 73). Next, a net output SPE of the engine 3 is calculated by adding the friction output FPE to the illustrated output IPE (step 74).

Finally, the calculated net output SPE is divided by the engine speed NE, and the resulting quotient is then multiplied by a predetermined conversion coefficient KPT to thereby calculate the engine torque TRQE (step 75), followed by terminating the present process.

Figure 9:
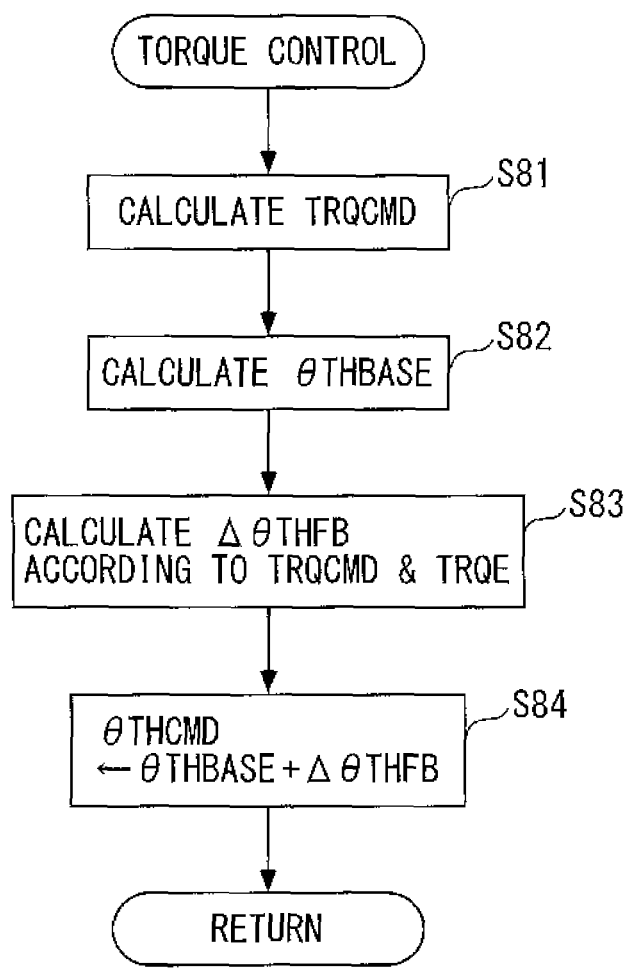
FIG. 9 is a flowchart of an engine torque control process.

The engine torque TRQE calculated as above is used for the control of the engine 3 and the vehicle. FIG. 9 shows a process for controlling the torque of the engine 3 by way of example. In the present process, first, in a step 81, a request torque TRQCMD requested from a driver of the vehicle is calculated. Calculation of the request torque TRQCMD is performed e.g. by searching a predetermined map (not shown) according to the accelerator pedal opening AP and the engine speed NE.

Next, a basic value θTHBASE of a target throttle valve opening θTHCMD is calculated by searching a predetermined map (not shown) according to the calculated request torque TRQCMD and the engine speed NE (step 82).

Next, a feedback correction term ΔθTHFB is calculated according to a difference between the request torque TRQCMD and the engine torque TRQE (step 83). Finally, the target throttle valve opening θTHCMD is calculated by adding the calculated feedback correction term ΔθTHFB to the basic value θTHBASE (step 84), followed by terminating the present process.

The throttle valve opening θTH is controlled based on the target throttle valve opening θTHCMD set as above, whereby the engine torque TRQE is controlled such that it becomes equal to the request torque TRQCMD.

Figure 7:
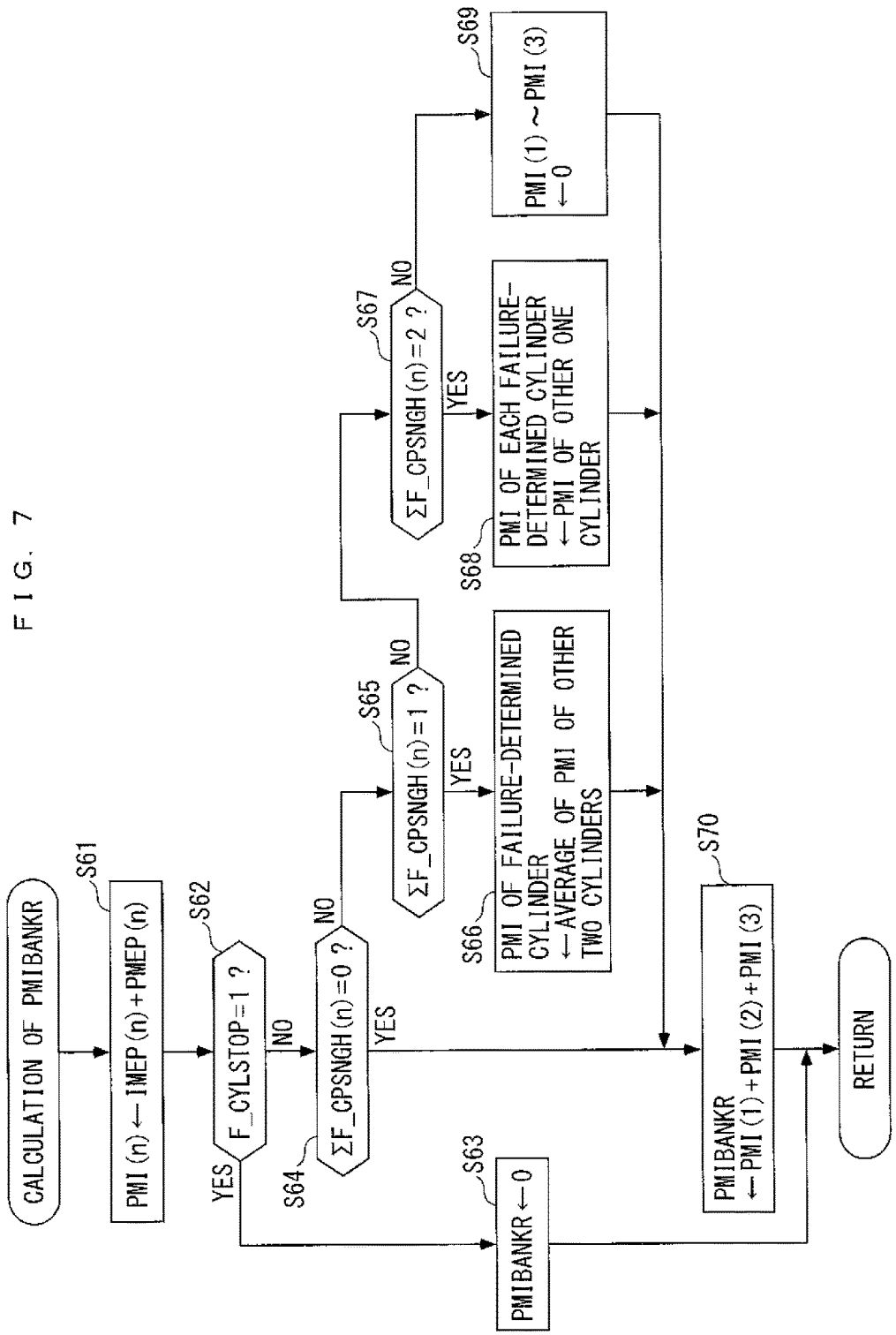
FIG. 7 is a flowchart of an illustrated average effective pressure calculation process.

As described above, according to the present embodiment, the illustrated average effective pressure PMI is calculated as the first combustion parameter which is dependent on the magnitude of the in-cylinder pressure, for each cylinder 3a, in each of the rear and front banks 3R and 3F (step 61 in FIG. 7). Further, when it is determined that the characteristic abnormality failure in which the magnitude of the detection value PCYL deviates from the actual in-cylinder pressure has occurred in part of the in-cylinder pressure sensors 21 in each of the rear and front banks 3R and 3F, the illustrated average effective pressure PMI of the failure-determined cylinder is replaced by the illustrated average effective pressure PMI of the other cylinder 3a or the average value of the illustrated average effective pressures PMI of the other cylinders 3a (steps 66 and 68).

As a consequence, even when the characteristic abnormality failure has occurred in part of the in-cylinder pressure sensors 21, the illustrated average effective pressure PMI of the failure-determined cylinder can be continuously calculated while properly maintaining the accuracy of the calculated value, and as a result, it is possible to continuously perform calculation of the illustrated average effective pressures PMIBANKR and PMIBANKF of both the banks 3R and 3F, and the illustrated average effective pressure PMIE of the engine 3 with high accuracy.

Further, the engine torque TRQE is calculated based on the illustrated average effective pressure PMIE of the engine 3 (FIG. 8), and the torque of the engine 3 is controlled such that the calculated engine torque TRQE becomes equal to the request torque TRQCMD (FIG. 9), and hence even when the characteristic abnormality failure has occurred, it is possible to continuously perform the torque control of the engine 3 with high accuracy.

Further, the magnitude of a deviation of the detection value PCYL from the in-cylinder pressure sensor 21 from the actual in-cylinder pressure is calculated as the hysteresis amount PHYS, and when the hysteresis amount PHYS is larger than the predetermined value PREFH, it is determined that the characteristic abnormality failure has occurred in the in-cylinder pressure sensor 21. This makes it possible to properly determine the characteristic abnormality failure, and it is possible to perform calculation of the illustrated average effective pressure PMI, the engine torque TRQE, and so forth, with high accuracy, according to a result of the failure determination while properly eliminating adverse influence of the deviation of the detection value PCYL from the actual in-cylinder pressure.

Note that the causes of a large deviation of the detection value PCYL from the in-cylinder pressure sensor 21 from the actual in-cylinder pressure include not only the above-mentioned deviation and drift of a gain of the in-cylinder pressure sensor 21, but also the following phenomenon found by the inventor: In a case where the in-cylinder pressure sensor 21 is an integral type which is integrally attached to the fuel injection valve 8 as in the case of the present embodiment and also the in-cylinder pressure sensor 21 is a new one, the detection value PCYL largely drops (lowers) from the actual value, from the vicinity of the end of the expansion stroke to the exhaust stroke. It is also confirmed that thereafter, as the operation of the engine 3 proceeds, the amount of drop decreases and the detection value PCYL recovers such that it becomes equal to the actual in-cylinder pressure.

If such a drop phenomenon of the detection value PCYL occurs, the illustrated average effective pressure PMI of the corresponding cylinder 3a is calculated as a smaller value than the correct value during the drop phenomenon, and accordingly, the engine torque TRQE is also calculated as a smaller value than the correct value. As a consequence, there is a fear that this makes it impossible to properly perform the torque control of the engine 3.

According to the above-described embodiment, it is possible to properly determine this drop phenomenon. More specifically, while the drop phenomenon occurs from the vicinity of the end of the expansion stroke to the exhaust stroke, as described above, the calculation section of the hysteresis amount PHYS is set to a time period extending before and after the start of the exhaust stroke, and belongs to the time period during which the drop phenomenon occurs, and hence an amount of drop of the detection value PCYL is reflected on the hysteresis amount PHYS.

Therefore, in a state where the amount of drop of the detection value PCYL is relatively large immediately after the drop phenomenon has occurred, the hysteresis amount PHYS exceeds the predetermined value PREFH, whereby it is determined that the characteristic abnormality failure has occurred in the in-cylinder pressure sensor 21, and accordingly, the illustrated average effective pressure PMI of the failure-determined cylinder 3a is replaced by the illustrated average effective pressure PMI of the other cylinder 3a.

Further, in the characteristic abnormality failure determination process in FIG. 6, the characteristic abnormality failure determination continues to be performed even after it is once determined that the characteristic abnormality failure has occurred. Therefore, when the amount of drop of the detection value PCYL decreases after that, the hysteresis amount PHYS becomes smaller than the predetermined value PREFH, whereby it comes to be determined that the characteristic abnormality failure has not occurred in the in-cylinder pressure sensor 21, and accordingly, the illustrated average effective pressure PMI of the corresponding cylinder 3a is directly employed.

From the above, even when the drop phenomenon of the detection value PCYL from the in-cylinder pressure sensor 21 has occurred, it is possible to properly determine whether or not the characteristic abnormality failure has occurred according to the magnitude of the amount of drop, and therefore, it is possible to continuously perform calculation of the engine torque TRQE and the like, the torque control of the engine 3, and so forth, with high accuracy.

Next, a description will be given of a process performed by the CPS calculation unit 2B, for calculating the maximum in-cylinder pressure angle θPmax, with reference to FIG. 10. This calculation process is performed for each cylinder 3a in synchronism with generation of the CRK signal, and as described hereafter, the maximum in-cylinder pressure angle θPmax is calculated in the expansion stroke.

In the present process, first, in a step 91, it is determined whether or not the characteristic abnormality failure flag F_CPSNGH is equal to 1. If the answer to the question of the step 91 is negative (NO), it is determined whether or not the fixed output failure flag F_CPSNGC and the phase deviation failure flag F_CPSNGP are equal to 1 (steps 92 and 93). If one of the answers to the questions of the steps 93 and 94 is affirmative (YES), i.e. if it is determined that the fixed output failure or the phase deviation failure has occurred in the in-cylinder pressure sensor 21, calculation of the maximum in-cylinder pressure angle θPmax is inhibited, and the present process is immediately terminated.

On the other hand, if the answers to the questions of the steps 92 and 93 are negative (NO), i.e. if it is determined that the in-cylinder pressure sensor 21 is normal, the maximum in-cylinder pressure angle θPmax is to be calculated, so that the process proceeds to a step 94 et seq. Further, also when the answer to the question of the step 91 is affirmative (YES), i.e. when it is determined that the characteristic abnormality failure has occurred in the in-cylinder pressure sensor 21, the process proceeds to the step 94 et seq.

As described above, in a case where it is determined that the in-cylinder pressure sensor 21 is in failure, when the failure pattern is the fixed output failure or the phase deviation failure, calculation of the maximum in-cylinder pressure angle θPmax is inhibited, and when the failure pattern is the characteristic abnormality failure, calculation of the maximum in-cylinder pressure angle θPmax is permitted.

In the step 94, it is determined whether or not an in-calculation flag F_CALPMAX indicating that the maximum in-cylinder pressure angle θPmax is being calculated is equal to 1. If the answer to the question of the step 94 is negative (NO), i.e. if the maximum in-cylinder pressure angle θPmax is not being calculated, it is determined whether or not the crank angle CA is equal to a first predetermined value CAPMAX1 corresponding to the start of the expansion stroke (step 95). If the answer to the question of the step 95 is negative (NO), the present process is immediately terminated.

On the other hand, if the answer to the question of the step 95 is affirmative (YES), calculation of the maximum in-cylinder pressure angle θPmax is to be started, so that the in-calculation flag F_CALPMAX is set to 1 (step 96), and the process proceeds to a step 97. Further, after execution of the step 96, the answer to the question of the step 94 becomes affirmative (YES), and in this case, the process directly proceeds to the step 97.

In this step 97, it is determined whether or not the current detection value PCYL from the in-cylinder pressure sensor 21 is larger than the immediately preceding value PCYLZ. If the answer to the question of the step 97 is affirmative (YES), i.e. if the detection value PCYL>the immediately preceding value PCYLZ holds, the detection value PCYL is calculated and stored as the maximum in-cylinder pressure Pmax (step 98), and the crank angle CA at the time is calculated and stored as the maximum in-cylinder pressure angle θPmax (step 99). After that, the steps 98 and 99 are executed whenever PCYL>PCYLZ holds in the step 97, whereby the maximum in-cylinder pressure Pmax and the maximum in-cylinder pressure angle θPmax are updated.

After execution of the step 99, or if the answer to the question of the step 97 is negative (NO), it is determined in a step 100 whether or not the crank angle CA is equal to a second predetermined value CAPMAX2 corresponding to the end of the expansion stroke. If the answer to the question of the step 100 is negative (NO), the detection value PCYL from the in-cylinder pressure sensor 21 is shifted to the immediately preceding value PCYLZ (step 101), followed by terminating the present process.

On the other hand, if the answer to the question of the step 100 is affirmative (YES), i.e. if the expansion stroke is terminated, calculation of the maximum in-cylinder pressure angle θPmax is to be terminated, so that the in-calculation flag F_CALPMAX is set to 0 (step 102), followed by terminating the present process. Thus, the maximum in-cylinder pressure angle θPmax stored last in the step 99 is determined as the final maximum in-cylinder pressure angle θPmax.

Figure 11:
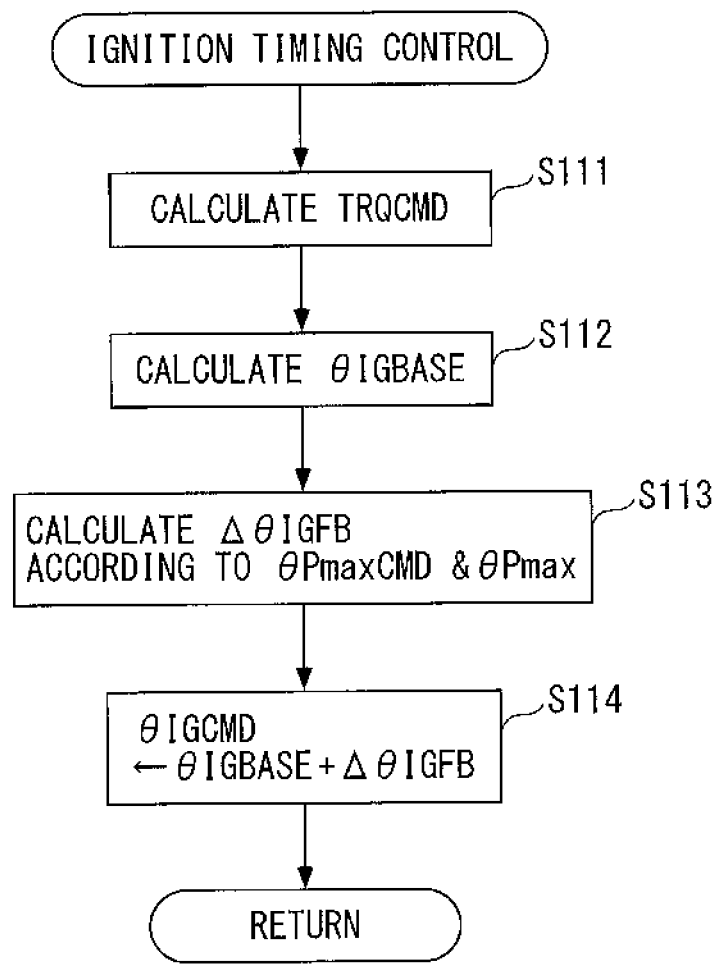
FIG. 11 is a flowchart of an ignition timing control process.

FIG. 11 shows a control process for controlling the ignition timing θIG, which is performed using the maximum in-cylinder pressure angle θPmax calculated as above. In the present process, first, in a step 111, the request torque TRQCMD is calculated in a similar manner to the step 81 in FIG. 9.

Next, a basic value θIGBASE of a target ignition timing θIGCMD is calculated by searching a predetermined map (not shown) according to the request torque TRQCMD and the engine speed NE (step 112).

Next, a feedback correction term ΔθIGFB is calculated according to a difference between a predetermined target maximum in-cylinder pressure angle θPmaxCMD and the calculated maximum in-cylinder pressure angle θPmax (step 113). Finally, the target ignition timing θIGCMD is calculated by adding the calculated feedback correction term ΔθIGFB to the basic value θIGBASE (step 114), followed by terminating the present process.

The target ignition timing θIGCMD is set as above, and the ignition timing θIG is controlled based on the set target ignition timing θIGCMD, whereby the maximum in-cylinder pressure angle θPmax is controlled such that it becomes equal to the target maximum in-cylinder pressure angle θPmaxCMD.

Figure 10:
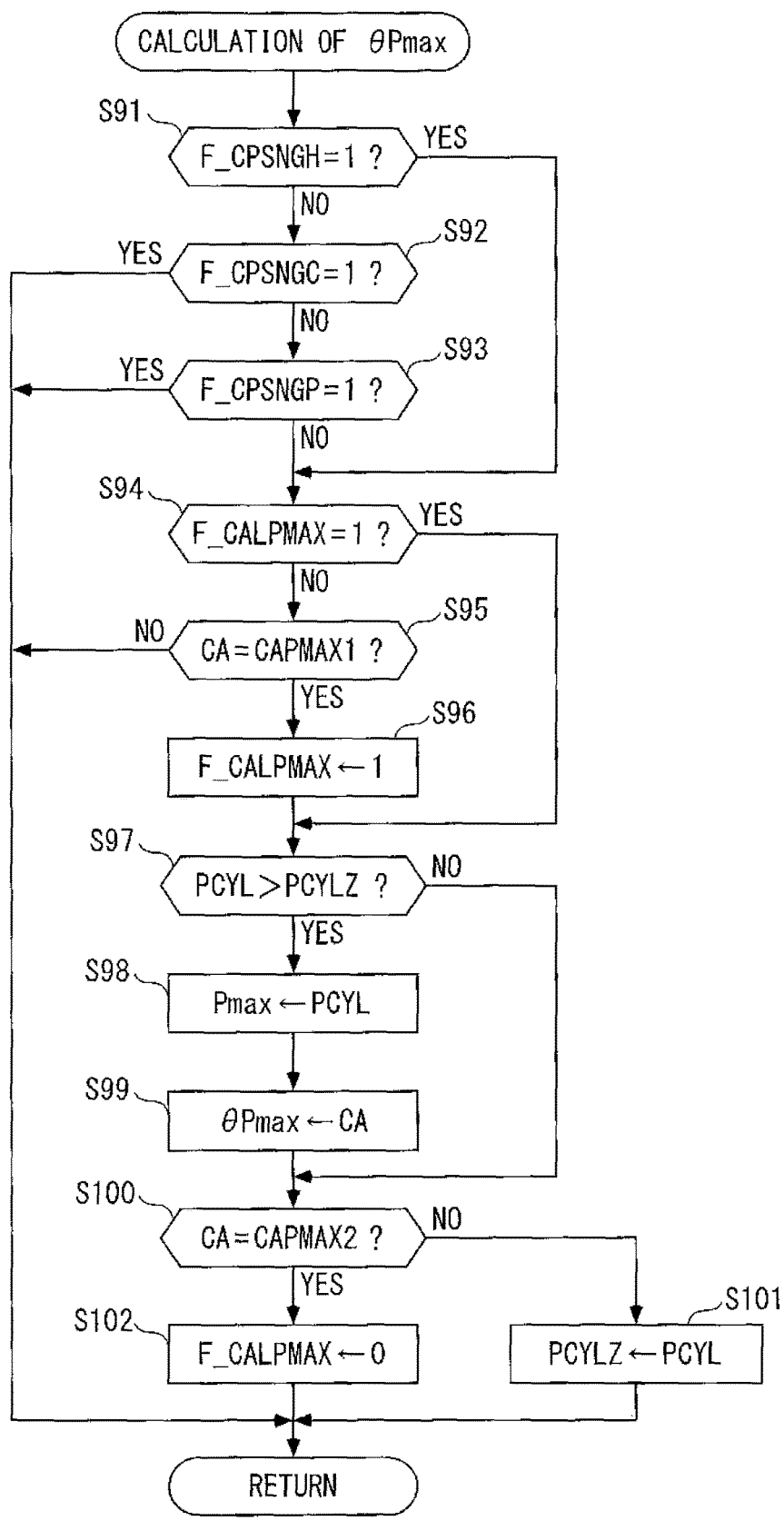
FIG. 10 is a flowchart of a maximum in-cylinder pressure angle calculation process.

As described above, according to the present embodiment, the maximum in-cylinder pressure angle θPmax is calculated for each cylinder 3a as the second combustion parameter (step 99 in FIG. 10). Further, in a case where it is determined that the in-cylinder pressure sensor 21 is in failure, when the failure pattern is the characteristic abnormality failure, the maximum in-cylinder pressure angle θPmax of the corresponding cylinder 3a is calculated based on the detection value PCYL from the in-cylinder pressure sensor 21 determined to be in failure. This makes it possible to continuously calculate the maximum in-cylinder pressure angle θPmax while maintaining the accuracy of the calculated value, and accordingly, it is possible to continuously perform the ignition timing control using the maximum in-cylinder pressure angle θPmax with high accuracy.

On the other hand, when the failure pattern is the fixed output failure or the phase deviation failure, calculation of the maximum in-cylinder pressure angle θPmax of the failure-determined cylinder is inhibited (steps 92 and 93), and hence it is possible to positively avoid erroneous calculation of the maximum in-cylinder pressure angle θPmax.

Note that the present invention is by no means limited to the above-described embodiment, but it can be practiced in various forms. For example, although in the embodiment, the illustrated average effective pressure PMI of each cylinder 3a is calculated as the first combustion state parameter. The first combustion state parameter can be any desired parameter insofar as it is a parameter dependent on the magnitude of the in-cylinder pressure, and may be, for example, the maximum in-cylinder pressure Pmax in the expansion stroke, the above-mentioned illustrated average effective pressure IMEP during the compression and expansion strokes, or the illustrated average effective pressure PMEP during the exhaust and intake strokes. In such a case, calculation of any of these first combustion state parameters is performed according to the result of determination of the characteristic abnormality failure in the similar manner to the case of the illustrated average effective pressure PMI described as above.

Further, in the embodiment, the maximum in-cylinder pressure angle θPmax of each cylinder 3a is calculated as the second combustion state parameter. The second combustion state parameter can be any desired parameter insofar as it is a parameter which is dependent on a state of change in in-cylinder pressure with respect to the crank angle and is expressed by the crank angle, and may be, for example, a crank angle at which a predetermined combustion mass rate can be obtained (e.g. MFB 50) or the actual ignition timing. In such a case, calculation of any of these second combustion state parameters is performed according to the result of determination of the characteristic abnormality failure in the similar manner to the case of the maximum in-cylinder pressure angle θPmax described as above, and is inhibited according to the result of determination of the fixed output failure and the phase deviation failure.

Further, although in the embodiment, the illustrated average effective pressure PMI of each cylinder 3a is calculated, and then, the illustrated average effective pressure PMI of the failure-determined cylinder is finally determined by replacing the PMI value by the PMI value or average value of the PMI values of the other cylinder(s) 3a according to the result of determination of the characteristic abnormality failure, the illustrated average effective pressure PMI may be finally determined by the following manner: Only the illustrated average effective pressures PMI of the cylinders 3a other than the failure-determined cylinder are calculated according to the result of determination of the characteristic abnormality failure, and an appropriate one of the calculated illustrated average effective pressures PMI may be selected so as to use the same as the PMI value of the failure-determined cylinder.

Further, although in the embodiment, the engine 3 is e.g. a V-type six-cylinder engine, the type of the engine 3 and the number of cylinders 3a may be set as desired. Further, although in the embodiment, the in-cylinder pressure sensor 21 is provided in each of all the cylinders 3a, the in-cylinder pressure sensor 21 may be provided in at least two which are part of the cylinders 3a, and in this case, the present invention is applied to the part of the cylinders 3a and the in-cylinder pressure sensors 21 provided in the part of the cylinders 3a.

Further, although in the embodiment, a unit for performing processing, such as calculation of the combustion state parameter and control of the engine 3, is separated into the CPS calculation unit 2B and the ECU 2, which perform respective predetermined processes, the role sharing of the two units may be changed, and the two units may be integrated into a single unit.

Furthermore, although in the above-described embodiment, the present invention is applied to the engine for a vehicle, this is not limitative, but it can be applied to various engines other than the engine for a vehicle, e.g. engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A combustion state parameter calculation method for an internal combustion engine, which calculates, based on detection values from a plurality of in-cylinder pressure sensors provided in at least two cylinders of the engine, each for detecting in-cylinder pressure which is pressure in a cylinder associated therewith, a combustion state parameter indicative of a combustion state in the cylinder, for use in controlling the internal combustion engine, the method comprising:
    a first combustion state parameter-calculating step of calculating, as the combustion state parameter, a first combustion state parameter dependent on the magnitude of the in-cylinder pressure, based on the detection value from the in-cylinder pressure sensor, on a cylinder-by-cylinder basis; and
    a failure determining step of determining whether or not a characteristic abnormality failure in which the magnitude of the detection value from the in-cylinder pressure sensor deviates from an actual in-cylinder pressure has occurred, on an in-cylinder pressure sensor-by-in-cylinder pressure sensor basis,
    wherein when it is determined that the characteristic abnormality failure has occurred in at least one of the in-cylinder pressure sensors, and has not occurred in at least one of the other of the in-cylinder pressure sensors, said first combustion state parameter-calculating step calculates the first combustion state parameter of a cylinder provided with the at least one of the in-cylinder pressure sensors, based on the detection value from the at least one of the other of the in-cylinder pressure sensors, and
    wherein the internal combustion engine is configured to perform a cylinder resting operation for stopping combustion in part of the cylinders when predetermined conditions are satisfied,
    the combustion state parameter calculation method further comprising a determination inhibiting step of inhibiting, when the cylinder resting operation is being performed, failure determination of the in-cylinder pressure sensor provided in the part of the cylinders in which combustion is stopped.

2. The combustion state parameter calculation method according to claim 1, wherein the in-cylinder pressure sensor is provided in each of all cylinders of the engine and
    wherein the first combustion state parameter is a torque parameter indicative of a torque which is generated by combustion in the cylinder,
    the combustion state parameter calculation method further comprising a total torque parameter-calculating step of calculating a sum of the torque parameters of all of the cylinders as a total torque parameter indicative of a total torque output from the engine.

3. The combustion state parameter calculation method according to claim 2, further comprising a hysteresis amount-calculating step of calculating a hysteresis amount indicative of the magnitude of deviation of the detection value from the in-cylinder pressure sensor from the actual in-cylinder pressure, and wherein said failure determining step determines, when the calculated hysteresis amount is larger than a predetermined value, that the characteristic abnormality failure has occurred in the in-cylinder pressure sensor.

4. The combustion state parameter calculation method according to claim 1, further comprising a hysteresis amount-calculating step of calculating a hysteresis amount indicative of the magnitude of deviation of the detection value from the in-cylinder pressure sensor from the actual in-cylinder pressure, and
    wherein said failure determining step determines, when the calculated hysteresis amount is larger than a predetermined value, that the characteristic abnormality failure has occurred in the in-cylinder pressure sensor.

* * * * *